United States Patent [19]

Yamazaki et al.

[11] Patent Number: 4,504,355
[45] Date of Patent: Mar. 12, 1985

[54] CONCENTRATOR SYSTEM

[75] Inventors: Kazuhiro Yamazaki, Hyogo; Takamichi Miwa, Osaka, both of Japan

[73] Assignee: Daicel Chemical Industries, Ltd., Osaka, Japan

[21] Appl. No.: 441,891

[22] Filed: Nov. 15, 1982

Related U.S. Application Data

[63] Continuation of Ser. No. 274,563, Jun. 7, 1981, abandoned.

[30] Foreign Application Priority Data

Jun. 18, 1980 [JP] Japan .................................. 55-83256

[51] Int. Cl.³ .............................................. B01D 1/20
[52] U.S. Cl. ........................................ 159/3; 159/48.2
[58] Field of Search ................ 159/3, 4 R, 4 CC, 4 B, 159/4 F, 4 GC, 48.1, 48.2; 202/163, 205, 232, 236, 237; 203/88; 196/114, 115, 126, 127, 128, 155

[56] References Cited

U.S. PATENT DOCUMENTS 3,396,475 9/1968 Scheibel .............................. 159/4 R Primary Examiner—Frank Sever
Attorney, Agent, or Firm—Sughrue, Mion, Zinn, Macpeak, and Seas

[57] ABSTRACT

A concentrator including a vacuum evaporator having a cylindrical upper part and a lower part in the form of an inverted cone. A pipe for introducing a feedstock solution is installed with a downwardly opening end thereof positioned in substantially the center of the vacuum evaporator. A pipe is provided for removing solvent vapor from the evaporator, and a pipe is provided for recovering concentrated solution from the bottom of the evaporator.

12 Claims, 1 Drawing Figure

CONCENTRATOR SYSTEM

This is a continuation of application Ser. No. 274,563, filed June 7, 1981, now abandoned.

BACKGROUND OF THE INVENTION

The invention relates to an apparatus for isolating an evaporative solvent from a polymer solution to recover a concentrated solution. In particular, the invention relates to an apparatus for isolating hydrous acetic acid from an acetyl cellulose solution that has passed through acetylation and aging steps, to thereby obtain a solution having a concentration suitable for feeding it to a subsequent precipitation step.

Generally, the more concentrated is a solution that contains a polymer as solute, the higher is its viscosity and the smaller its heat transfer efficiency. Therefore, evaporation under forced agitation or in the form of a thin film is conventionally used to perform concentration without reducing its efficiency. For this purpose, a uniaxial bent extruder, biaxial bent extruder and talling film evaporator, and the like have been used. Usually, these devices use the surface of a casing wall as a heating surface, and in most cases, the gap between the heating surface and the revolving parts, namely, the clearance between the surface of the casing wall and the farthest end of the agitating blades, is held to a minimum and each agitating blade is provided with scraper at its end.

With this construction, a large apparatus cannot be manufactured because of limited precision as to the symmetry of machined parts around the revolving axis. For instance, an apparatus having a heat transfer surface larger than 10 m$^2$ is very difficult to manufacture. Furthermore, the deterioration of the polymer in the solution due to local overheating can be effectively prevented by evaporating the solvent under vacuum, but an apparatus of an agitator type with an airtight construction is complex and accompanied by a high production cost. An acetyl cellulose solution just after aging contains not only acetyl cellulose but also water-soluble inorganic salts as solute. During the concentration step, these salts form crystals which tend to be rubbed between the agitating blades and the surface of the casing wall. The crystal particles wear the blades and surface of the casing wall, and they also contaminate the acetyl cellulose solution.

An acetyl cellulose solution after aging is composed of a solvent made for acetic acid and water and a solute made for acetyl cellulose and salts supplied or formed during aging. Containing about 20% of acetyl cellulose, the solution in this state is generally referred to as a dope. The acetyl cellulose in the dope is recovered by introducing the dope into water (non-solvent) to form a precipitate. If the dope concentration is increased to 25–30% of acetyl cellulose before it is sent to the precipitation step, less non-solvent need be used in the precipitation step and the amount of heat required for solvent recovery throughout the process steps is reduced greatly. But in the prior art technology, there is no apparatus suitable for concentration of the acetyl cellulose dope prior to the precipitation step.

SUMMARY OF THE INVENTION

Therefore, an object of the present invention is to provide a concentrator system which has a relatively simple construction but which yet achieves high concentration efficiency.

Another object of the invention is to provide an improved flash evaporator and related devices.

These objects are achieved by a concentrator system which includes a vacuum evaporator having a cylindrical upper part and a lower part in the form of an inverted cone, a pipe for introducing a feedstock solution so installed that a downwardly opening end is positioned in substantially the center of the vacuum evaporator, a pipe for removing the solvent vapor from the evaporator, and a pipe for recovering the concentrated solution from the bottom of the evaporator.

The drawing shows the best mode of the invention.

DESCRIPTION OF THE PREFERRED EMBODIMENTS

Figure 1:
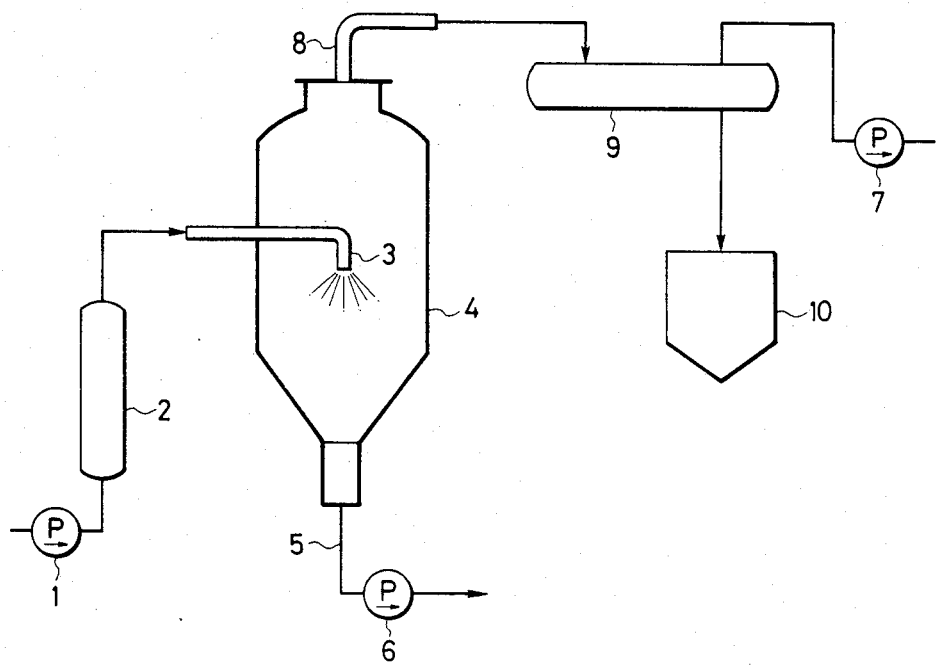

The invention will hereafter be described with reference to the accompanying drawing which shows a preferred embodiment of a concentrator system according to the invention. A feed dope preheated before entering a feed pump 1 is further heated by a heater 2 to a predetermined temperature. In accordance with the invention, the evaporator need not be heated at all and all the heat corresponding to the latent heat of evaporation is supplied by the preheating step and the heater 2. The heated dope is passed through a pipe connected to the heater and is flashed into an evaporator 4 in a vacuum through the open end 3.

With part of the solvent lost by evaporation, the flashed dope reaches the wall of the evaporator. As the dope flows down along the wall, more solvent is evaporated to form a concentrated dope which is collected in the bottom of the evaporator and discharged therefrom by a pump 6 through a pipe 5. The solvent, which is a mixture of acetic acid and water in the illustrated embodiment that is evaporated in the evaporator, is directed through a pipe 8 by a vacuum pump 7 and liquefied by a condenser 9 for storage in a tank 10.

A preferred method of preheating the feed dope is to supply steam directly into the dope. This is effective for reducing the viscosity of the dope with heat and for decreasing the load on the pump 1. Heating by blowing of steam can be effectively performed by a continuous stationary type flow mixer such as a static mixer produced by Noritake Co., Ltd. or a square mixer produced by Sakura Seisakusho, K.K., both of Japan, which are capable of performing thorough mixing of the dope and steam. The feed pump 1 may be a conventional pump for high-viscosity liquid such as a gear pump or a snake pump. The heater 2 may be a known type heat exchanger such as a shell-and-tube heat exchanger or a double pipe heat exchanger.

The open end of the dope supply pipe is positioned to face downwardly in substantially the center of the evaporator. When the dope passing through the pipe reaches the open end, it foams due to the sudden evaporation of the solvent vapor. The bubbles burst instantaneously to let the vapor therein escape, while at the same time, the dope is scattered in drops which condense on the inside wall of the evaporator and flow to the bottom.

The diameter d of the open end of the feed supply pipe is one of the factors that determine the evaporation rate. A suitable range of the diameter d is related to the inside diameter D of the upper part of the evaporator, preferably, the ratio of d to D is in the range of from 0.08 to 0.015. If the diameter d is too small, a great resistance to the flow of the dope in the area around the end of the pipe prevents smooth flashing of the dope. If the diameter d is too large, the dope droplets are scattered over a wide area irregularly and form an unevenly concentrated solution. Therefore, the lower limit of the diameter d, which depends primarily on the viscosity of the dope, is about 10 mm for an aged dope of acetyl cellulose. The upper limit is primarily governed by correlation with the inside diameter D of the evaporator and is usually about 0.30 D.

The lower part of the evaporator is in the form of an inverted cone so that the concentrated dope flows down the inside wall and is retained on the bottom from which it is directed through the recovery pipe. To cause the dope to flow smoothly, the slant surface of the inverted cone desirably forms an angle of at least 60° with respect to the horizontal line, and for providing a short efficient evaporator, the angle preferably does not exceed 70°.

The concentrated dope is passed through the pipe 5 to the discharge pipe 6 that also serves to pump the dope further to the subsequent precipitation step. The pump may be of a known type for high-viscosity liquid and may be of any desired suitable construction.

The degree of vacuum created in the evaporator, which is controlled by the vacuum pump 7, is usually in a range of 50–500 Torr, more preferably, 100–150 Torr. A higher degree of vacuum allows more solvent to be evaporated, but then the condenser must be cooled to a greater extent. If the degree of vacuum is too low, more heat is necessary to elevate the temperature of the feed dope. In either case, the operational costs are increased. Therefore, the degree of vacuum in the concentration step preparatory to the precipitation step should generally be within the above-defined range of from 50 to 500 Torr.

The evaporator of the concentrating apparatus of the invention does not include a rotating mechanism or a heating mechanism. Moreover, with the resulting fairly simple construction, it achieves advantageous solvent recovery from a high-viscosity solution. The apparatus of the invention can be used to concentrate not only an aged acetyl cellulose dope but also a saponified dope of polyvinyl acetate.

This invention wil now be described in greater detail with reference to the following Examples, wherein a concentrator system of the invention is used to concentrate an aged acetyl cellulose dope. It is to be understood that the scope of the invention is by no means limited to these Examples.

EXAMPLE 1

An aged acetyl cellulose dope (with a solids content of about 20% and a viscosity of 80 to 100 poise at 80° C.) was concentrated by an apparatus of the invention. The specifications of the apparatus and its operating conditions were as follows:

| | |
|---|---|
| Diameter of feed pipe | 21.7 mm |
| I.D. and length of evaporator | 216.3 × 600 mm |
| Diameter of vapor discharge pipe | 60.5 mm |
| Diameter of dope concentrate discharge pipe | 114.3 mm |
| Discharge pump | Rotary pump, Model ND of Stainless Steel Pump Corp. |
| Pressure in evaporator | 100 Torr |
| Feed dope supplied | 54 kg/hr |
| Concentrated dope discharged | 38 kg/hr |
| Distilled solvent obtained by vapor cooling | 16 kg/hr |
| Composition of distilled solvent (wt %) | acetic acid/water = 80.7/19.3 |
| Temperature of discharged vapor | approx. 58° C. |

The concentrated dope had a solid content of about 26% and a viscosity at 55% C. of 5,000 poise.

EXAMPLE 2

An aged acetyl cellulose dope was concentrated and acetic acid recovered by a concentrator larger than that used in Example 1. The specifications of the concentrator and its operating conditions are listed below.

| | |
|---|---|
| Diameter of feed pipe | 89.1 mm |
| I.D. and length of evaporator | 700.0 × 1300 mm |
| Diameter of vapor discharge pipe | 267.4 mm |
| Diameter of dope concentrate discharge pipe | 216.3 mm |
| Discharge pump | Rotary pump, Model ND |
| Pressure in evaporator | 100 Torr |
| Feed dope supplied | 1164 kg/hr |
| Concentrated dope discharged | 771 kg/hr |
| Distilled solvent obtained by vapor cooling | 393 kg/hr |
| Composition of distilled solvent (wt %) | Acetic acid/water = 74/26 |
| Temperature of discharged vapor | 56° C. |

What is claimed is:

1. A concentrator comprising; a system designed and configured for concentrating an acetyl cellulose polymer solution and including a vacuum source, a heater for preheating said polymer solution; an evaporator having a cylindrical upper part and a lower part in the form of an inverted cone; an inlet pipe for introducing said heated polymer solution from said heater, said inlet pipe having a downwardly opening end positioned in substantially the center of said evaporator; a first outlet pipe for evacuating said evaporator and removing solvent vapor from said evaporator; and a second outlet pipe for recovering concentrated solution from a bottom of said evaporator.

2. The concentrator according to claim 1 wherein a ratio of a diameter d of said open end of said pipe for introducing feedstock solution to an inside diameter D of said upper part of the evaporator be is in a range of from 0.08 to 0.15.

3. The concentrator according to claim 2 wherein said acetyl cellulose solution has been aged and contains aqueous acetic acid as a solvent.

4. The evaporator of claim 2 wherein the pressure in said evaporator is in a range of 50 to 500 Torr.

5. The evaporator of claim 2 wherein the pressure in said evaporator is in a range of 100 to 150 Torr.

6. The concentrator according to claim 1 wherein a slanted surface of said lower part of said vacuum evaporator in the form of an inverted cone forms an angle of at least 60° with respect to a horizontal line.

7. The concentrator according to claim 6 wherein said acetyl cellulose solution has been aged and contains aqueous acetic acid as a solvent.

8. The evaporator of claim 6 wherein the pressure in said evaporator is in a range of 50 to 500 Torr.

9. The evaporator of claim 6 wherein the pressure in said evaporator is in a range of 100 to 150 Torr.

10. The concentrator according to claim 1 wherein said acetyl cellulose solution which has been aged and which contains aqueous acetic acid as a solvent.

11. The evaporator of claim 1 wherein the pressure in said evaporator is in a range of 50 to 500 Torr.

12. The evaporator of claim 1 wherein the pressure in said evaporator is in a range of 100 to 150 Torr.

* * * * *